United States Patent
Tsai et al.

(10) Patent No.: US 9,184,684 B2
(45) Date of Patent: Nov. 10, 2015

(54) MOTOR DRIVING CIRCUIT AND METHOD THEREOF

(75) Inventors: Ming-Jung Tsai, Hsinchu (TW); Kun-Min Chen, Changhua County (TW); Ching-Sheng Li, Hsinchu County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 239 days.

(21) Appl. No.: 13/609,187

(22) Filed: Sep. 10, 2012

(65) Prior Publication Data

US 2013/0307458 A1   Nov. 21, 2013

(30) Foreign Application Priority Data

May 15, 2012   (TW) .............. 101117233 A

(51) Int. Cl.
 *H02P 6/00* (2006.01)
 *H02P 7/29* (2006.01)
 *H02P 7/00* (2006.01)

(52) U.S. Cl.
 CPC ............ *H02P 7/2913* (2013.01); *H02P 7/0044* (2013.01)

(58) Field of Classification Search
 USPC ............ 318/400.27, 400.28, 400.29, 400.32, 318/400.34, 293, 294, 674, 254.2, 535; 360/75, 78.04; 702/85
 See application file for complete search history.

(56) References Cited

U.S. PATENT DOCUMENTS

| | | | | |
|---|---|---|---|---|
| 5,117,164 | A * | 5/1992 | Ishii et al. | 318/135 |
| 6,876,510 | B2 * | 4/2005 | Heydt et al. | 360/75 |
| 7,863,841 | B2 * | 1/2011 | Menegoli et al. | 318/400.29 |
| 8,497,641 | B2 * | 7/2013 | Yamashita et al. | 318/66 |
| 2004/0080858 | A1 * | 4/2004 | Suzuki | 360/75 |
| 2008/0116752 | A1 * | 5/2008 | Kuroda et al. | 307/125 |
| 2010/0182715 | A1 * | 7/2010 | Harmer | 360/75 |
| 2011/0031917 | A1 * | 2/2011 | Shimizu | 318/400.27 |
| 2011/0062910 | A1 * | 3/2011 | Tsai et al. | 318/400.35 |

FOREIGN PATENT DOCUMENTS

| | | |
|---|---|---|
| TW | I311852 | 7/2009 |
| TW | I327413 | 7/2010 |
| TW | I327815 | 7/2010 |
| TW | 201037962 | 10/2010 |
| TW | 201110532 | 3/2011 |

* cited by examiner

*Primary Examiner* — Eduardo Colon Santana
*Assistant Examiner* — Bickey Dhakal
(74) *Attorney, Agent, or Firm* — Winston Hsu; Scott Margo

(57) ABSTRACT

A motor driving circuit for driving a motor includes: a driving-stage circuit, for converting an input voltage into a first output voltage and a second output voltage, and comprising a first transistor, a second transistor, a third transistor and a fourth transistor; an output stage circuit, for converting the first output voltage or the second output voltage into a motor speed signal; and a control unit, coupled to the first, the second, the third and the fourth transistors and the output stage circuit, for generating first, second, third and fourth transistor control signals to control the first, the second, the third and the fourth transistors respectively.

6 Claims, 5 Drawing Sheets

MOTOR DRIVING CIRCUIT AND METHOD THEREOF

BACKGROUND OF THE INVENTION

1. Field of the Invention

The present invention relates to a motor driving circuit which drives a direct-current (DC) motor, and more particularly, to a motor driving circuit which uses an output terminal of a motor driving circuit as a motor speed signal for determining the speed of a DC motor, and a motor driving method thereof.

2. Description of the Prior Art

A DC motor driver is a necessary power transformation device in modern industries. The DC motor is capable of transforming electricity into kinetic energy required for driving devices. Conventional motors include DC motors, AC motors, and stepping motors. DC motors and AC motors are often applied in products which do not require particularly delicate manipulation, for example, blades of an electric fan are usually rotated with a DC motor or AC motor. In recent years, many countries have been aware that significant climate change has occurred in the world due to over-use of electric power resource, such that power saving has become major policy in many countries. If power consumption of electric devices can be effectively reduced, there will be a huge effect on the speed of climate change. Therefore, how to reduce power consumption in electric devices has become a major objective in the industry.

SUMMARY OF THE INVENTION

It is a primary objective of the present invention to provide a motor driving circuit that adopts pulse width modulation (PWM) mechanism, for achieving power saving and generating a motor speed signal to measure the speed of a DC motor.

The present invention discloses a motor driving circuit for driving a motor, which comprises a driving-stage circuit for converting an input voltage into a first output voltage and a second output voltage. The driving-stage circuit comprises an input terminal, for receiving the input voltage; a first output terminal, for outputting the first output voltage; a second output terminal, for outputting the second output voltage; a first transistor, coupled between the input terminal and the first output terminal, for switching a conducting condition between the input terminal and the first output terminal according to a first transistor control signal; a second transistor, coupled between the first output terminal and a ground terminal, for switching a conducting condition between the first output terminal and the ground terminal according to a second transistor control signal; a third transistor, coupled between the input terminal and the second output terminal, for switching a conducting condition between the input terminal and the second output terminal according to a third transistor control signal; and a fourth transistor, coupled between the second output terminal and the ground terminal, for switching a conducting condition between the second output terminal and the ground terminal according to a fourth transistor control signal. The motor driving circuit further comprises an output stage circuit, coupled to one of the first and the second output terminals, for converting the first output voltage or the second output voltage into a motor speed signal; and a control unit, coupled to the first, the second, the third and the fourth transistors and the output stage circuit, for generating the first, the second, the third and the fourth transistor control signals to control the first, the second, the third and the fourth transistors respectively.

The present invention further discloses a method for driving a motor, which comprises providing a driving-stage circuit, for converting an input voltage into a first output voltage and a second output voltage; and providing an output stage circuit, for converting the first output voltage or the second output voltage into a motor speed signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
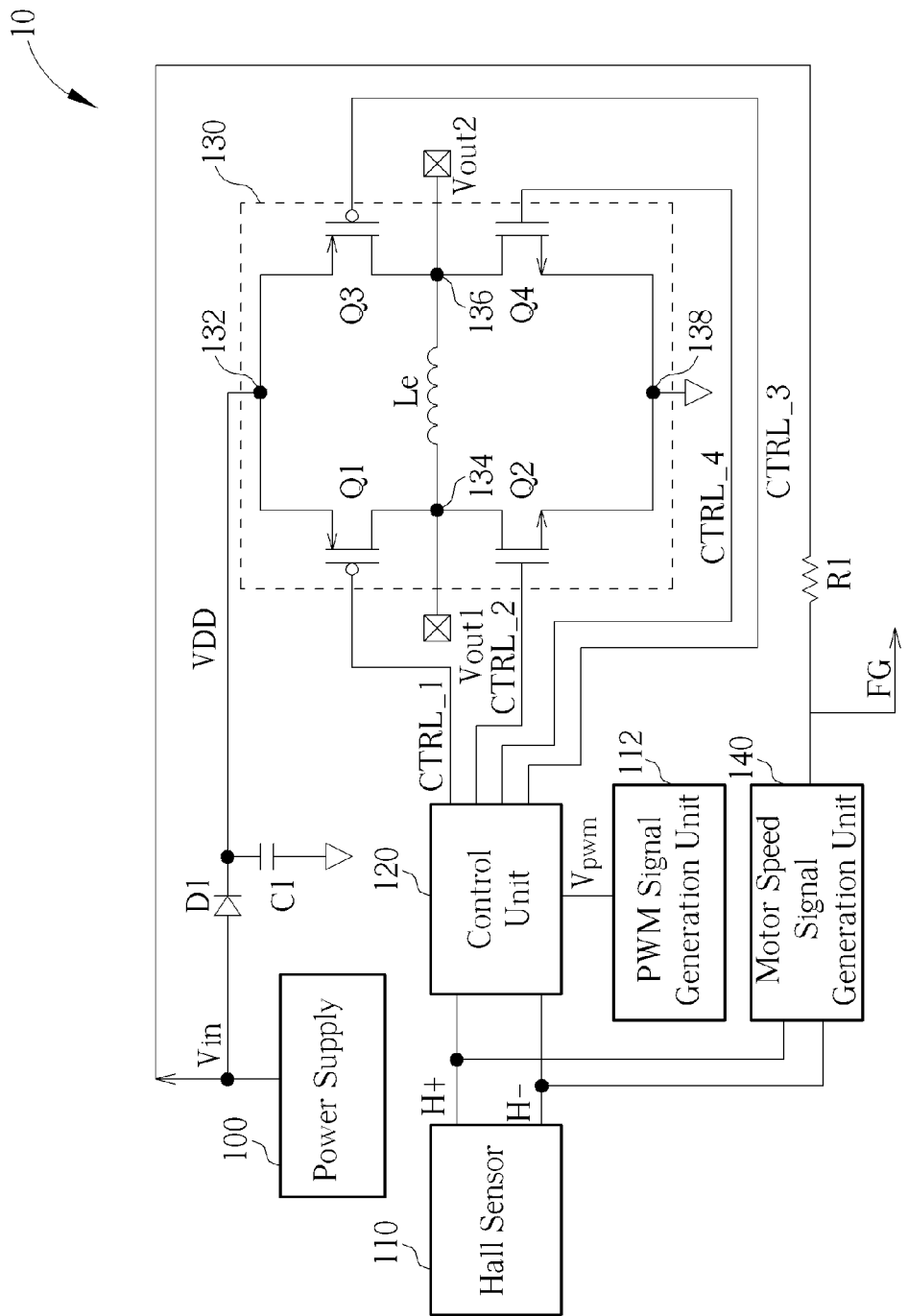
FIG. 1 is a schematic diagram of a motor driving circuit.

Please refer to FIG. 1, which is a schematic diagram of a motor driving circuit 10. The motor driving circuit 10 includes a power supply 100, an input capacitor C1, a protecting diode D1, a Hall sensor 110, a pulse width modulation (PWM) signal generation unit 112, a control unit 120, a driving circuit 130, a motor load Le, a motor speed signal generation unit 140 and a frequency generation resistor R1. The power supply 100 is utilized for generating an input voltage Vin. The protecting diode D1 is coupled between the power supply 100 and the input capacitor C1, for protecting the power supply 100 and for preventing reverse current, which may burn down the entire integrated circuit. The input capacitor C1 is coupled to the power supply 100. A voltage difference between both terminals of the input capacitor C1 is a supply voltage VDD. The Hall sensor 110 senses locations of the magnetic poles of the motor load Le for generating a first timing control signal H+ and a second timing control signal H− according to the working characteristic of the motor load Le. The PWN signal generation unit 112 is used for generating a PWM signal Vpwm, of which the duty cycle can be adjusted according to requirements of the system. The control unit 120, which is coupled to the Hall sensor 110 and the PWM signal generation unit 112, is used for receiving the first timing control signal H+, the second timing control signal H− and the PWM signal Vpwm and generating a first transistor control signal CTRL_1, a second transistor control signal CTRL_2, a third transistor control signal CTRL_3 and a fourth transistor control signal CTRL_4 accordingly, so as to control the driving circuit 130. In detail, the driving-stage circuit 130 includes an input terminal 132, a first output terminal 134, a second output terminal 136, a first transistor Q1, a second transistor Q2, a third transistor Q3 and a fourth transistor Q4. The input terminal 132, which is coupled to the connection point between the power supply 100 and the input capacitor C1, is used for receiving the supply voltage VDD. The first input terminal 134 and the second input terminal 136 are used for outputting a first output voltage Vout1 and a second output voltage Vout2, respectively. The first transistor Q1, which is coupled to the control unit 120, the input terminal 132 and the first output terminal 134, is used for switching the conducting condition between the input terminal 132 and the first output terminal 134 according to the first transistor control signal CTRL_1. The second transistor Q2, which is coupled to the control unit 120, the ground terminal 138 and the first output terminal 134, is used for switching the conducting condition between the first output terminal 134 and the ground terminal 138 according to the second transistor control signal CTRL_2. The third transistor Q3, which is coupled to the control unit 120, the input terminal 132 and the second output terminal 136, is used for switching the conducting condition between the input terminal 132 and the second output terminal 136 according to the third transistor control signal CTRL_3. The fourth transistor Q4, which is coupled to the control unit 120, the ground terminal 138 and the second output terminal 136, is used for switching the conducting condition between the second output terminal 136 and the ground terminal 138 according to the fourth transistor control signal CTRL_4. The first transistor Q1, the second transistor Q2, the third transistor Q3 and the fourth transistor Q4 can be either a p-channel metal-oxide semiconductor field-effect transistor (MOSFET) or an n-channel MOSFET, respectively. In FIG. 1, the first transistor Q1 and the third transistor Q3 are p-channel MOSFETs, while the second transistor Q2 and the fourth transistor Q4 are n-channel MOSFETs, but this is merely one example of a possible configuration. The motor load Le, which is coupled to the first output terminal 134 and the second output terminal 136, is used for generating a motor current IL according to the first output voltage Vout1 and the second output voltage Vout2. When the motor current IL is positive, the direction of the motor current IL is from the first output terminal 134 to the second output terminal 136; otherwise, when the motor current IL is negative, the direction of the motor current IL is from the second output terminal 136 to the first output terminal 134.

The motor speed signal generation unit 140, which is coupled to the Hall sensor 110 and the frequency generation resistor R1, is used for generating a motor speed signal FG according to a relationship between the first timing control signal H+ and the second timing control signal H− outputted from the Hall sensor 110. For example, when the voltage level of first timing control signal H+ is higher than that of the second timing control signal H−, the motor speed signal FG changes to a high voltage level; conversely, when the voltage level of the first timing control signal H+ is lower than that of the second timing control signal H−, the motor speed signal FG changes to a low voltage level. Because the switching frequency of the motor speed signal FG is identical to that of the voltage difference between the first timing control signal H+ and the second timing control signal H−, the motor speed signal FG can correspond to the speed of the motor load Le.

Figure 2:
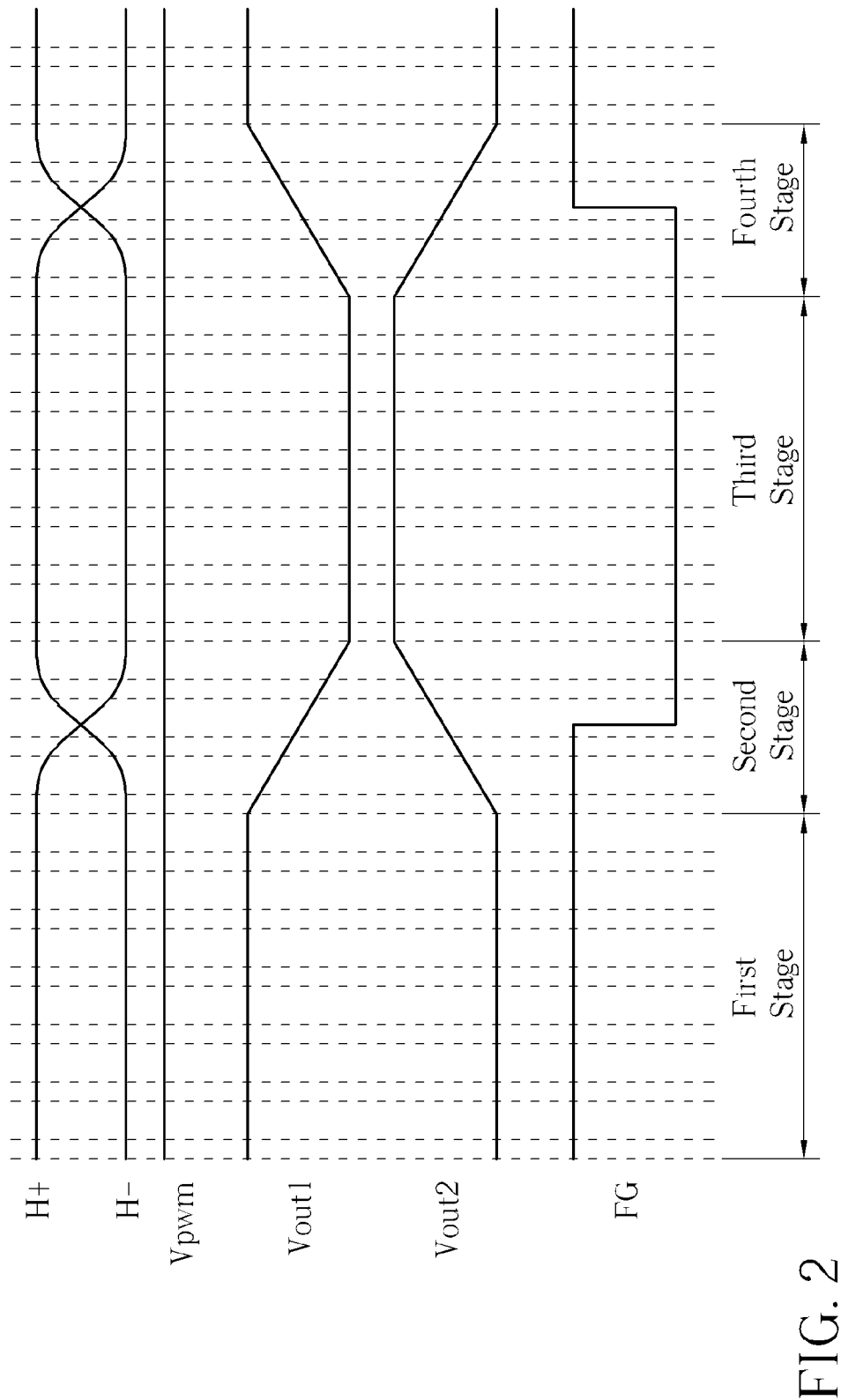
FIG. 2 is a timing diagram of the first timing control signal, the second timing control signal, the PWM signal (with 100% duty cycle 100%), the first output voltage, the second output voltage and the motor speed signal shown in FIG. 1.

Please refer to FIG. 2, which is a timing diagram of the first timing control signal H+, the second timing control signal H−, the PWM signal Vpwm (with duty cycle 100%), the first output voltage Vout1, the second output voltage Vout2 and the motor speed signal FG shown in FIG. 1. As shown in FIG. 2, when the control unit 120 is implemented with an analog amplifier control circuit, at the time when the first timing control signal H+ and the second timing control signal H− cross, i.e. when the polarity of the motor load Le changes (during the second and the fourth stages), the first output voltage Vout1 and the second output voltage Vout2 switch between high and low voltage levels by gentle slope. As can be seen from FIG. 2, when the duty cycle of the PWM signal Vpwm is 100% (i.e. the PWM signal is always at the high voltage level), the first output voltage Vout1, the second output voltage Vout2, the motor speed signal FG, the first timing control signal H+ and the second timing control signal H− are the same. Notably, the motor driving circuit does not have power saving efficiency when the duty cycle of the PWM signal Vpwm is 100%.

Figure 3:
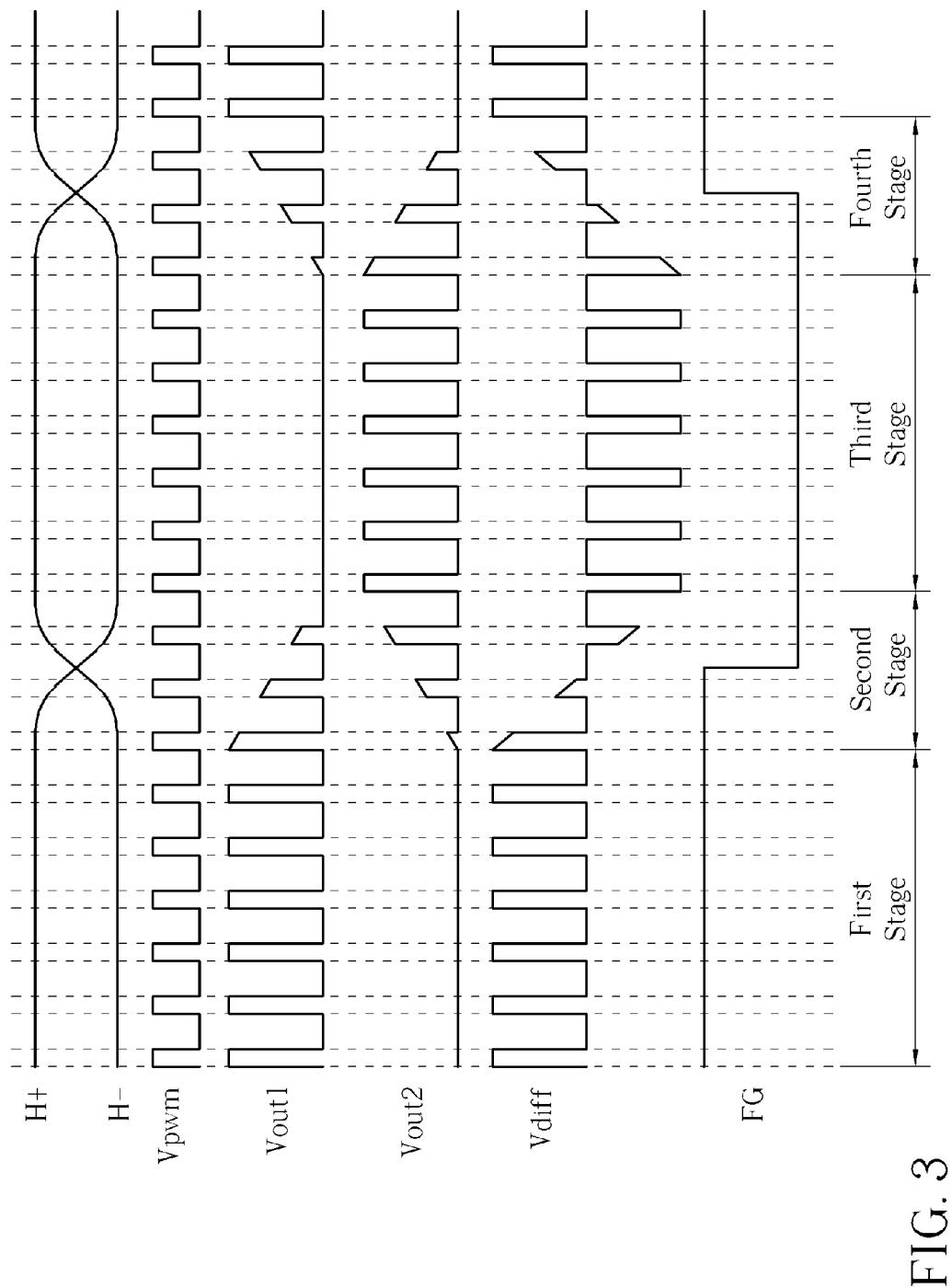
FIG. 3 is a timing diagram of the first timing control signal, the second timing control signal, the PWM signal (with duty cycle below 100%), the first output voltage, the second output voltage, the voltage difference between the first and the second output voltages and the motor speed signal shown in FIG. 1.

Please also refer to FIG. 3, which is a timing diagram of the first timing control signal H+, the second timing control signal H−, the PWM signal Vpwm (with duty cycle other than 100%), the first output voltage Vout1, the second output voltage Vout2, the motor speed signal FG and the voltage difference Vdiff between the first output voltage Vout1 and the second output voltage Vout2 shown in FIG. 1. As can be seen from FIG. 3, when the duty cycle of the PWM signal Vpwm is not 100%, the first output voltage Vout1 and the second output voltage Vout2 switch between the low and high voltage level, so as to achieve power saving or speed adjusting.

In detail, when the operation of the motor driving circuit 10 enters the first stage, the first output voltage Vout1 changes according to the PWM signal Vpwm, while the second output voltage Vout2 remains at the low voltage level. When the PWM signal switches to the high voltage level, the first output voltage Vout1 changes to the high voltage level; when the PWM signal switches to the low voltage level, the first output voltage Vout1 changes to the low voltage level.

When the operation of the motor driving circuit 10 leaves the first stage and enters the second stage, the first output voltage Vout1 and the second output voltage Vout2 change according to the PWM signal Vpwm. In detail, during the period that the PWM signal is at the high voltage level, the first output voltage Vout1 decreases from the high voltage level to the low voltage level, and the second output voltage Vout2 increases from the low voltage level to the high voltage level; during the period that the PWM signal is at the low voltage level, both the first output voltage Vout1 and the second output voltage Vout2 switch to the low voltage level.

When the operation of the motor driving circuit 10 leaves the second stage and enters the third stage, the first output voltage Vout1 remains at the low voltage level, while the second output voltage Vout2 changes according to the PWM signal Vpwm. When the PWM signal switches to the high voltage level, the second output voltage Vout2 changes to the high voltage level; when the PWM signal switches to the low voltage level, the second output voltage Vout2 changes to the low voltage level.

When the operation of the motor driving circuit 10 leaves the third stage and enters the fourth stage, the first output voltage Vout1 and the second output voltage Vout2 change according to the PWM signal Vpwm. In detail, during the period that the PWM signal is at the high voltage level, the first output voltage Vout1 increases from the low voltage level to the high voltage level, and the second output voltage Vout2 decreases from the high voltage level to the low voltage level; during the period that the PWM signal is at the low voltage level, both the first output voltage Vout1 and the second output voltage Vout2 switch to the low voltage level.

The motor driving circuit 10 operates the above sequence (the first, the second, the third and the fourth level) repeatedly to achieve power saving efficiency. When the PWM signal is added to the motor driving circuit 10, however, the switch period between high and low voltage level will be the combination of the switch period of the PWM signal and the rotation period of the original motor load Le (i.e. the rotation period of the motor load Le with duty cycle 100%), which is different from the period of the motor speed signal. Therefore, when the PWM signal is applied to the motor driving circuit 10, the motor speed signal generation unit 140 is required for generating a motor speed signal as the speed of the motor load. In addition, if the motor driving circuit 10 is packaged as an integrated circuit, an additional output pin is needed to output the motor speed signal FG, causing the hardware cost to rise.

Figure 4:
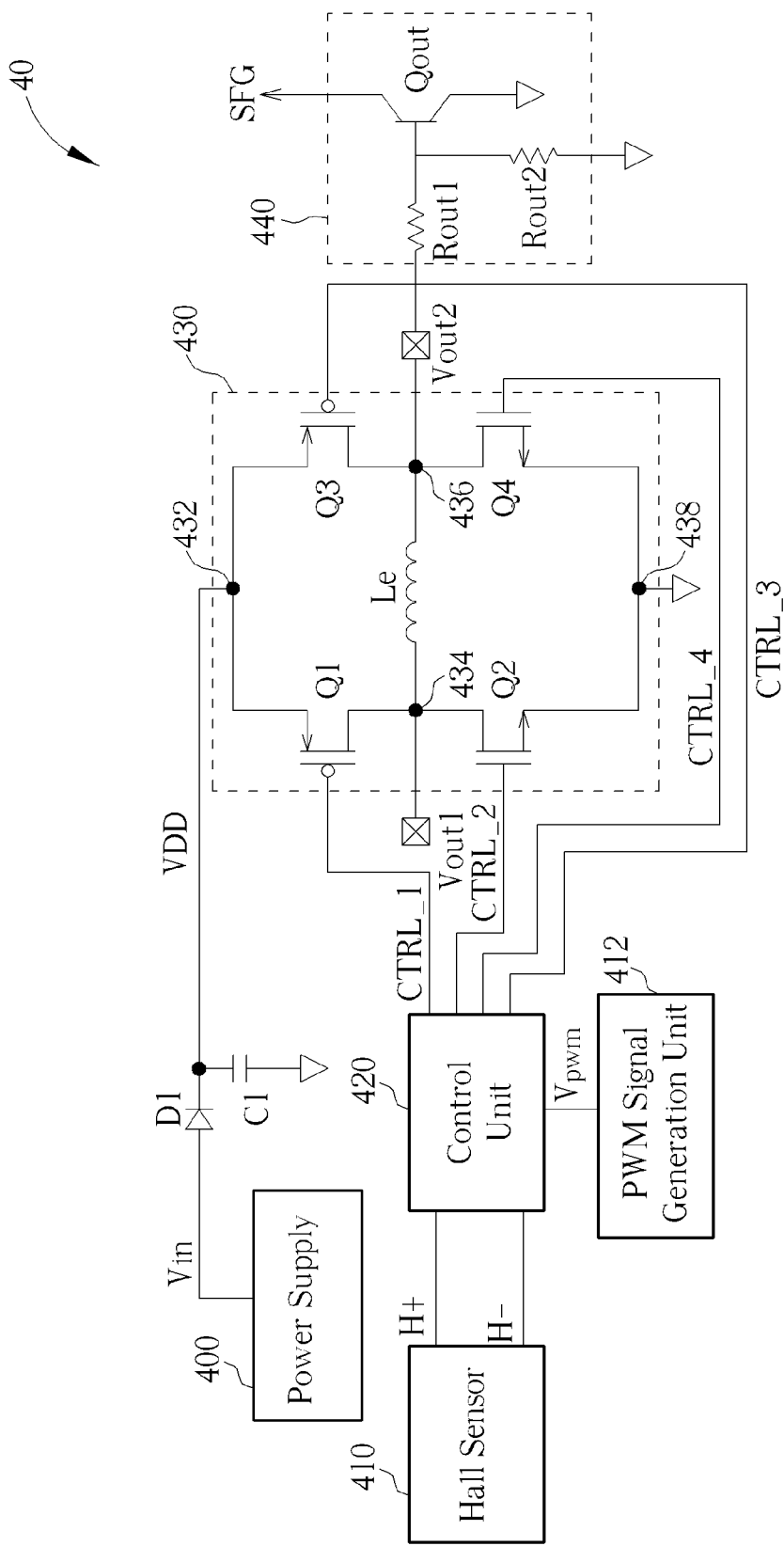
FIG. 4 is a schematic diagram of a motor driving circuit according to an embodiment of the present invention.

Consequently, the present invention provides a motor driving circuit to improve on the aforementioned problems. Please refer to FIG. 4, which is a schematic diagram of a motor driving circuit 40 according to an embodiment of the present invention. Since some of the elements in the motor driving circuit 40 are similar to those in the motor driving circuit 10 in FIG. 1, the corresponding symbols in the motor driving circuit 10 are also used in the motor driving circuit 40 for simplicity. The motor driving circuit 40 includes a power supply 400, an input capacitor C1, a protecting diode D1, a Hall sensor 410, a PWM signal generation unit 412, a control unit 420, a driving circuit 430, a motor load Le and an output stage circuit 440. The power supply 400 is utilized for generating an input voltage Vin. The protecting diode D1 is coupled between the power supply 400 and the input capacitor C1, for protecting the power supply 400 and for preventing a reverse current, which may burn down the entire integrated circuit. The input capacitor C1 is coupled to the power supply 400. A voltage difference between both terminals of the input capacitor C1 is a supply voltage VDD. The Hall sensor 410 senses locations of the magnetic poles of the motor load Le for generating a first timing control signal H+ and a second timing control signal H− according to the working characteristic of the motor load Le. The PWN signal generation unit 412 is used for generating a PWM signal Vpwm, of which the duty cycle can be adjusted according to requirements of the system. The control unit 420, which is coupled to the Hall sensor 410 and the PWM signal generation unit 412, is used for receiving the first timing control signal H+, the second timing control signal H− and the PWM signal Vpwm and generating a first transistor control signal CTRL_1, a second transistor control signal CTRL_2, a third transistor control signal CTRL_3 and a fourth transistor control signal CTRL_4 accordingly, so as to control the driving circuit 430. In detail, the driving-stage circuit 430 includes an input terminal 432, a first output terminal 434, a second output terminal 436, a first transistor Q1, a second transistor Q2, a third transistor Q3 and a fourth transistor Q4. The input terminal 432, which is coupled to the connection point between the power supply 400 and the input capacitor C1, is used for receiving the supply voltage VDD. The first input terminal 434 and the second input terminal 436 are used for outputting a first output voltage Vout1 and a second output voltage Vout2, respectively. The first transistor Q1, which is coupled to the control unit 420, the input terminal 432 and the first output terminal 434, is used for switching the conducting condition between the input terminal 432 and the first output terminal 434 according to the first transistor control signal CTRL_1. The second transistor Q2, which is coupled to the control unit 420, the ground terminal 438 and the first output terminal 434, is used for switching the conducting condition between the first output terminal 434 and the ground terminal 438 according to the second transistor control signal CTRL_2. The third transistor Q3, which is coupled to the control unit 420, the input terminal 432 and the second output terminal 436, is used for switching the conducting condition between the input terminal 432 and the second output terminal 436 according to the third transistor control signal CTRL_3. The fourth transistor Q4, which is coupled to the control unit 420, the ground terminal 438 and the second output terminal 436, is used for switching the conducting condition between the second output terminal 436 and the ground terminal 438 according to the fourth transistor control signal CTRL_4. The first transistor Q1, the second transistor Q2, the third transistor Q3 and the fourth transistor Q4 can be either a p-channel metal-oxide semiconductor field-effect transistor (MOSFET) or an n-channel MOSFET, respectively. In FIG. 4, the first transistor Q1 and the third transistor Q3 are p-channel MOSFETs, while the second transistor Q2 and the fourth transistor Q4 are n-channel MOSFETs, but this is merely one example of a possible configuration. In addition, the first transistor Q1, the second transistor Q2, the third transistor Q3 and the fourth transistor Q4 can be bipolar junction transistors (BJTs). For example, the first transistor Q1 and the third transistor Q3 can be NPN BJTs, and the second transistor Q2 and the fourth transistor Q4 can be PNP BJTs. The first transistor Q1, the second transistor Q2, the third transistor Q3 and the fourth transistor Q4 can be collocated with MOSFETs and BJTs. The motor load Le, which is coupled to the first output terminal 434 and the second output terminal 436, is used for generating a motor current IL according to the first output voltage Vout1 and the second output voltage Vout2. When the motor current IL is positive, the direction of the motor current IL is from the first output terminal 434 to the second output terminal 436; otherwise, when the motor current IL is negative, the direction of the motor current IL is from the second output terminal 436 to the first output terminal 434. The output stage circuit 440, which is coupled to the second output terminal 436, includes a first output resistor Rout1, a second output resistor Rout2 and an output transistor Qout, for converting the second output voltage Vout2 to the motor speed signal SFG and outputting the motor speed signal SFG through the collector terminal of the output transistor Qout.

The difference between the motor driving circuit 40 and the motor driving circuit is that the motor driving circuit 40 does not have the motor speed signal generation unit 140 shown in FIG. 1. Further, the motor driving circuit 40 adds an output stage circuit 440 for converting the second output voltage Vout2 into the motor speed signal SFG and outputting the motor speed signal through the collector terminal of the output transistor Qout. Notably, the Hall sensor 410, the PWM signal generation unit 412, the control unit 420 and the driving circuit 430 of the motor driving circuit 40 may be packaged into an integrated circuit with four output pins: one is for inputting the input voltage Vin from the power supply 400, another is for grounding by connecting to the ground terminal 438, and the other two are for outputting the first output voltage Vout1 and the second output voltage Vout2, respectively, and connecting to the motor load Le. Additionally, the output stage circuit 440 shown in FIG. 4 illustrates one feasible implementation for converting the second output voltage Vout2 into the motor speed signal SFG. A user may adjust the contents in the output stage circuit 440 by various ways for realizing such conversion.

Figure 5:
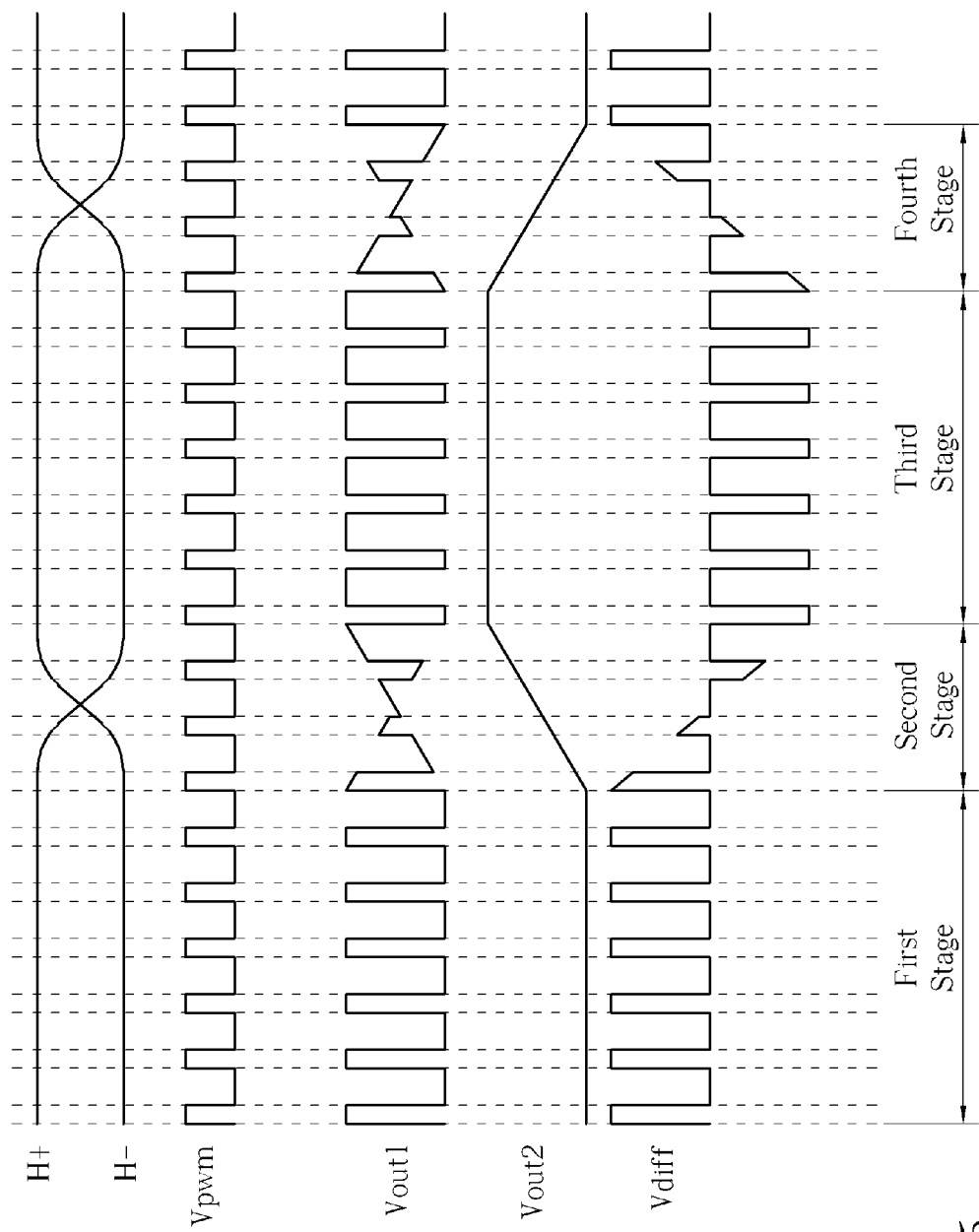
FIG. 5 is a timing diagram of the first timing control signal, the second timing control signal, the PWM signal, the first output voltage, the second output voltage and the voltage difference between the first and the second output voltages shown in FIG. 4.

Please also refer to FIG. 5, which is a timing diagram of the first timing control signal H+, the second timing control signal H−, the PWM signal Vpwm, the first output voltage Vout1, the second output voltage Vout2 and the voltage difference Vdiff between the first output voltage Vout1 and the second output voltage Vout2 shown in FIG. 4. As shown in FIG. 5, the first output voltage Vout1 and the second output voltage Vout2 switch their voltage levels according to the PWM signal Vpwm. The control unit 420 is implemented with an analog amplifier control circuit, such that at the time when the motor driving circuit 40 operates in the second and the fourth stage, the first output voltage Vout1 and the second output voltage Vout2 switch between the high and low voltage levels as illustrated by the gentle slope in FIG. 5.

When the operation of the motor driving circuit 40 enters the first stage, the first output voltage Vout1, the second output voltage Vout2 and the voltage difference Vdiff between the first output voltage Vout1 and the second output voltage Vout2 are the same as those of the motor driving circuit operating in the first stage; the related details are therefore not detailed herein.

When the operation of the motor driving circuit 40 leaves the first stage and enters the second stage, the first output voltage Vout1 switches its status according to a switching of the PWM signal Vpwm. Conversely, the second output voltage Vout2 increases from the low voltage level to the high voltage level and does not switch its status according to the switching of the PWM signal Vpwm.

In detail, when the PWM signal Vpwm switches to the high voltage level, by controlling the first transistor Q1, the second transistor Q2, the third transistor Q3 and the fourth transistor Q4 using the control unit 420, the first output voltage Vout1 switches to a voltage having a duty cycle which is 100% of the PWM signal Vpwm and decreases towards the low voltage level.

When the PWM signal Vpwm switches to the low voltage level, by controlling the first transistor Q1, the second transistor Q2, the third transistor Q3 and the fourth transistor Q4 using the control unit 420, the first output voltage Vout1 switches to the second output voltage Vout2 having a duty cycle which is 100% of the PWM signal Vpwm and increases towards the high voltage level.

When the operation of the motor driving circuit 40 leaves the second stage and enters the third stage, the first output voltage Vout1 continuously switches between the high and low voltage levels according to the PWM signal Vpwm. That is, when the PWM signal Vpwm switches to the high voltage level, the first output voltage Vout1 switches to the low voltage level; when the PWM signal Vpwm switches to the low voltage level, the first output voltage Vout1 switches to the high voltage level. Conversely, the second output voltage Vout2 remains at the high voltage level and does not switch according to the PWM signal Vpwm.

When the operation of the motor driving circuit 40 leaves the third stage and enters the fourth stage, the first output voltage Vout1 switches its status according to the PWM signal Vpwm. Conversely, the second output voltage Vout2 remains at the high voltage level and does not switch according to the PWM signal Vpwm.

In detail, when the PWM signal Vpwm switches to the high voltage level, by controlling the first transistor Q1, the second transistor Q2, the third transistor Q3 and the fourth transistor Q4 using the control unit 420, the first output voltage Vout1 switches to a voltage having a duty cycle which is 100% of the PWM signal Vpwm and decreases towards the high voltage level.

When the PWM signal Vpwm switches to the low voltage level, by controlling the first transistor Q1, the second transistor Q2, the third transistor Q3 and the fourth transistor Q4 using the control unit 420, the first output voltage Vout1 switches to the second output voltage Vout2 having a duty cycle which is 100% of the PWM signal Vpwm and increases towards the low voltage level.

In brief, during any of the first, the second, the third and the fourth stages in which the motor driving circuit 40 operates, when the PWM signal Vpwm switches to the high voltage level, the first output voltage Vout1 is the same as a voltage having a duty cycle which is 100% of the PWM signal Vpwm; when the PWM signal Vpwm switches to the low voltage level, the second output voltage Vout2 is the same as a voltage having a duty cycle which is 100% of the PWM signal Vpwm.

Through the cycle consisting of the first, the second, the third and the fourth cycle in sequence illustrated in FIG. 5, the period of switching the second output voltage Vout2 between the high voltage level and low voltage level will be the same as the motor speed signal FG in FIG. 3, and the waveform of the second output voltage Vout2 is generally the same as that of the motor speed signal FG in FIG. 3; therefore, the second output terminal 436 can be utilized for outputting the motor speed signal SFG through the collector terminal of the output transistor Qout instead of the motor speed signal FG in FIG. 3, by connecting to the output stage circuit 440. Users can add a resistor (not shown) as a pull-up resistor to the input voltage Vin (or supply voltage VDD) for the motor speed signal SFG, such that the output transistor Qout becomes a voltage pull-down device. As such, the motor speed signal SFG becomes the same as the motor speed signal FG, so that the second output terminal 436 can be directly utilized for generating the motor speed signal SFG instead of the motor speed signal FG, and the motor driving circuit 40 does not need an additional circuit (e.g. the motor speed signal generation unit 140 in FIG. 1). Further, no output pin corresponding to an additional circuit needs to be added when the motor driving circuit 40 (without the driving circuit 440) is packaged as an integrated circuit, which saves on the hardware costs.

In addition, because the waveform of the voltage difference Vdiff between the first output voltage Vout1 and the second output voltage Vout2 (Vout1-Vout2) in FIG. 2 is the same as that in FIG. 5, it can be known that the motor load Le of the motor driving circuit 10 receives the same work as the motor load Le of the motor driving circuit 40. That is, at a same time, the current through the motor load Le of the motor is the same as that through the motor load Le of the motor driving circuit 40, so that the power consumptions of the motor speed circuits 10, 40 are the same. In other words, the driving power to motor load Le of the motor driving circuit 10 is the same as that of the motor driving circuit 40.

It should be noted that the motor driving circuit 40 can alternatively select the first output terminal 434 to connect to the output stage circuit 440 and output the motor speed signal SFG through the collector terminal of the output transistor Qout. Those skilled in the art can modify the method of controlling the first transistor Q1, the second transistor Q2, the third transistor Q3 and the fourth transistor Q4 using the control unit 420 according to the description of FIG. 5 to change the waveforms of the first output voltage Vout1 and the second output voltage Vout2 in order to accomplish the aforementioned method.

The control unit 420 may alternatively be implemented by digital logic circuits, such that when the motor driving circuit 40 operates in the second and the fourth stage, the first output voltage Vout1 and the second output voltage Vout2 convert between the high and the low voltage levels by a steep slope. Such an implementation is known to those skilled in the art; thus, no description is given herein.

Additionally, for the motor driving circuit of the present invention without applying PWM technology, voltage level change periods of the two output terminals are the same as the period of the motor speed signal, and thus one of the two output terminals can be utilized as the motor speed signal.

From the embodiment of the present invention as described above a method of driving a motor can be derived, which includes providing a driving-stage circuit for converting an input voltage into a first output voltage and a second output voltage and providing an output stage circuit for converting the first output voltage or the second output voltage into a motor speed signal. The motor speed signal can replace that generated through the motor speed signal generation unit. For adding PWM technology to save power consumption of the motor, the method of the present invention further includes providing a pulse width modulation (PWM) signal generation unit for controlling the driving-stage circuit to convert the input voltage into the first and the second output voltages. The method of the present invention further includes providing a Hall sensor for controlling the driving-stage circuit to convert the input voltage into the first and the second output voltages.

To sum up, the motor driving circuit of the present invention can apply PWM technology to make output terminals switch between high and low voltage levels to achieve power saving and utilize one of the output terminals as a motor speed signal for replacing the motor speed signal generated by additional circuits, which saves circuit costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor driving circuit for driving a motor, comprising:
    a driving-stage circuit, for converting an input voltage into a first output voltage and a second output voltage, the driving-stage circuit comprising:
        an input terminal, for receiving the input voltage;
        a first output terminal, for outputting the first output voltage;
        a second output terminal, for outputting the second output voltage;
        a first transistor, coupled between the input terminal and the first output terminal, for switching a conducting condition between the input terminal and the first output terminal according to a first transistor control signal;
        a second transistor, coupled between the first output terminal and a ground terminal, for switching a conducting condition between the first output terminal and the ground terminal according to a second transistor control signal;
        a third transistor, coupled between the input terminal and the second output terminal, for switching a conducting condition between the input terminal and the second output terminal according to a third transistor control signal; and
        a fourth transistor, coupled between the second output terminal and the ground terminal, for switching a conducting condition between the second output terminal and the ground terminal according to a fourth transistor control signal;
    an output stage circuit, coupled to one of the first and the second output terminals, for converting only one of the first output voltage and or the second output voltage into a motor speed signal;
    a control unit, coupled to the first, the second, the third and the fourth transistors and the output stage circuit, for generating the first, the second, the third and the fourth transistor control signals to control the first, the second, the third and the fourth transistors respectively; and
    a pulse width modulation (PWM) signal generation unit, coupled to the control unit, for generating a PWM signal;
    wherein the control unit generates the first, the second, the third and the fourth transistor control signals according to the PWM signal,
    wherein the output stage circuit comprises:
        a first resistor, coupled to either the first or the second output terminal;
        a second resistor, coupled to the first resistor and the ground terminal; and
        a fifth transistor, comprising:
            a base end, coupled to the first and the second resistors;
            an emitter end, coupled to the ground terminal; and
            a collector end, coupled to the control unit.

2. The motor driving circuit of claim 1, further comprising:
    a Hall sensor, coupled to the control unit, for generating a first timing control signal and a second timing control signal;
    wherein the control unit generates the first, the second, the third and the fourth transistor control signals according to the first and the second timing control signals.

3. The motor driving circuit of claim 1, wherein the first and the third transistors are p-channel metal-oxide semiconductor field-effect transistors (MOSFETs).

4. The motor driving circuit of claim 1, wherein the first and the third transistors are n-channel MOSFETs.

5. The motor driving circuit of claim 1, wherein the second and the fourth transistors are p-channel MOSFETs.

6. The motor driving circuit of claim 1, wherein the second and the fourth transistors are n-channel MOSFETs.

* * * * *